Sept. 1, 1925.

A. O. HELLERUD 1,551,602

TIRE SKID CHAIN CONNECTER

Original Filed Feb. 24, 1921

Inventor

Arthur O. Hellerud

Patented Sept. 1, 1925.

1,551,602

UNITED STATES PATENT OFFICE.

ARTHUR O. HELLERUD, OF WASHBURN, WISCONSIN, ASSIGNOR TO OFF'N'ON CHAIN CORPORATION, OF NEWARK, NEW JERSEY, A CORPORATION OF DELAWARE.

TIRE-SKID-CHAIN CONNECTER.

Application filed February 24, 1921, Serial No. 447,462. Renewed October 12, 1923.

*To all whom it may concern:*

Be it known that I, ARTHUR O. HELLERUD, a citizen of the United States, residing at Washburn, in the county of Bayfield and State of Wisconsin, have invented a new and useful Tire-Skid-Chain Connecter, of which the following is a specification.

My invention relates to chain connecters and has particular relation to devices for connecting together the ends of tire skid chains.

An object of this invention is to provide a chain connecter which will be simple to operate and will hold securely when in place.

A further object is to provide an improved device of the character described which will serve to tighten the chain as the guard is closed and will remain closed while in use.

Other objects of the invention will be in part obvious and will in part appear hereinafter.

For a fuller understanding of the nature and objects of the invention reference should be had to the following detailed description taken in connection with the accompanying drawing, in which.

Figure 3:
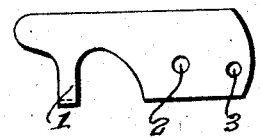
Figure 3 is a detail view of guard.
Figure 4:
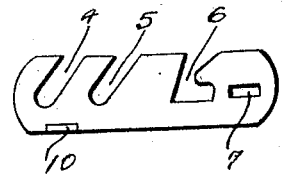
Figure 4 is a side view of the block.
Figure 5:
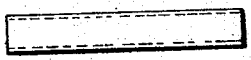
Fig. 5 is a plan view of the guard.
Figure 6:
Fig. 6 is a plan view of the connecting block member.

In the particular embodiment illustrated the block Fig. 4 is a piece of metal, oblong in shape, with curved ends. Indentations 4 and 5 are placed at one end at a slight angle, extending inwardly, about two thirds the width of the block, for hooking the loose end of the chain. At the other end of the block is a slotted hole 7, by which the guard is fastened with a rivet 3 to the block. The guard, Figure 3 is a piece of sheet metal, extending around two sides and one edge of the block, one corner being cut away to register with first indentation 4 in the block, together with a curved indentation cut in the guard to register with the second indentation 5 in the block, leaving the pieces of metal 1 to act as claws gripping the block to prevent accidental opening. The rivet 3 fastens the guard to the block, through the slot 7 and opposing openings 3' in the guard.

A chain is secured to the guard so the fastener is permanently attached thereto, this fastening being conveniently accomplished by means of a link 9 extending at opposite sides of the guard and attached thereto by means of a rivet 2 extending through the opposed openings 2' in the guard and lying in position to register with a third indentation 6 in the connecting block when the guard is moved to closed position. A notch or recess 6' opens laterally near the bottom of the indentation 6 extending longitudinally of the connecting block toward the slot 7 and forming a seat in which the rivet 2 is disposed when the guard is in closed position.

Figure 1:
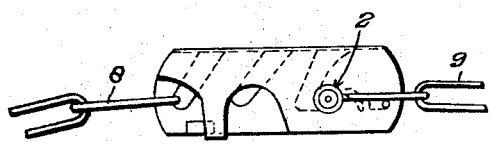
Figure 1 is a side elevation of the whole connecter.
Figure 2:
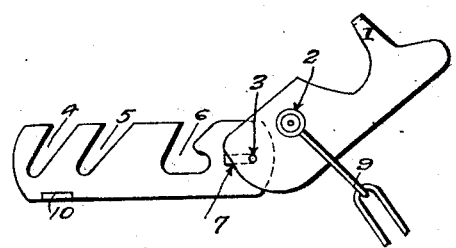
Figure 2 is a view of the connecter with guard open.

An oval edge 10 is formed in the lower edge of the guard substantially midway between the slots 4 and 5, and opposite the claws 1 on the guard. The tongue is adapted by its resilience to be received and held by said edge against accidental displacement. The guard is made of sheet metal, the sides of which are held in place by the two rivets 2 and 3. As shown in Figs. 2 and 3, the pivotal rivet 3 is nearer the lower edge of the guard than is the locking and chain-holding rivet 2. As a consequence of this relationship, the pull of the chain draws the rivet and guard to the side slightly and thus ensures a locking contact with the seat or shoulder 6. In operation the chain 9 is fastened to the guard, with the rivet 2. The loose end of the chain is hooked in the indentation, either 4 or 5, while the guard is fastened to the block with the rivet 3. Therefore the guard in closing acts as a lever, tightening the chain thru the travel of the rivet 2, from open position as shown in Fig. 2 to closed position as shown in Fig. 1, when the rivet 2 is in its seat 6'.

If the chain is under tension as is ordinarily the case in connecting the side members of an anti-skid chain, the pin or rivet 3 will be drawn to the outer end of the slot 7 as shown in Fig. 2 and when the guard member is moved toward closed position, the connection or rivet 2 will engage with the inclined face provided on the connecting block at the side of indentation 6, forcing or camming the connection 2 and guard forwardly bodily until the connection 2 passes under chain tension into its seat 6'. The guard is thus locked in closed position by engagement of the connecter 2 with the abutment overlying the seat 6'. The connecting block thus acts as a hook member having opposed oppositely directed hook seats for receiving connections to the terminal chain links, thereby transmitting the chain tension. Rearward movement of the guard member on the connecting block is permitted by the elongated slot 7 in which the pin 3 slides. The claws 1 are intended as a secondary lock, thru gripping the oval edge 10 of the block.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

A connecter including a connecting block having indentations therein providing open seats disposed substantially on the longitudinal axis of the block for the reception of opposed connections to the ends of a chain or the like so as to transmit chain tension through the block, one of said indentations having opening thereinto a recess extending longitudinally of the block substantially on the axis thereof and forming an overlying locking abutment, an inclined cam face on said connecting block contiguous to the recessed indentation, a guard member adapted to overlie the seats of the connecting block for retention of the chain connections, a pin and slot connection between said guard member and the end of said connecting block adjacent said longitudinally extending recess and being disposed between said recess and said adjacent block end whereby said guard member may move longitudinally on said block parallel to the axis thereof, or swing thereon to close said seats, one of said chain connections being freely initially receivable when the guard member is in open position in the open seat remote from said cam nose and remaining permanently therein while the guard member is in closed position and another of said chain connections being attached to said guard member near said pin and slot connection and bodily movable longitudinally with said guard member so as to be seated in said longitudinally extending recess and co-operating when so seated with said locking abutment to lock the guard member in closed position; said guard member being cammed forwardly when swung toward closed position by engagement with said inclined cam nose of said last mentioned chain connection, thereby bringing the latter into position to enter said longitudinally extending recess.

In testimony whereof I affix my signature.

ARTHUR O. HELLERUD.